United States Patent
Lee et al.

(10) Patent No.: US 11,050,065 B2
(45) Date of Patent: Jun. 29, 2021

(54) SEPARATOR FOR FUEL CELL INCLUDING GUIDE PATTERN AND FUEL CELL STACK INCLUDING THE SAME

(71) Applicants: KOREA INSTITUTE OF SCIENCE AND TECHNOLOGY, Seoul (KR); INDUSTRY-ACADEMIC COOPERATION FOUNDATION, YONSEI UNIVERSITY, Seoul (KR)

(72) Inventors: Jong Ho Lee, Seoul (KR); Kyung Joong Yoon, Seoul (KR); Sang Hyeok Lee, Seoul (KR); Dong Hwan Kim, Seoul (KR); Jong Sup Hong, Seoul (KR); Yong Gyun Bae, Seoul (KR)

(73) Assignees: Korea Institute of Science and Technology, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 220 days.

(21) Appl. No.: 16/287,296

(22) Filed: Feb. 27, 2019

(65) Prior Publication Data
US 2020/0075966 A1 Mar. 5, 2020

(30) Foreign Application Priority Data
Sep. 5, 2018 (KR) .......................... 10-2018-0106095

(51) Int. Cl.
*H01M 8/026* (2016.01)
*H01M 8/2483* (2016.01)

(52) U.S. Cl.
CPC .......... *H01M 8/026* (2013.01); *H01M 8/2483* (2016.02)

(58) Field of Classification Search
CPC ... H01M 8/0258; H01M 8/026; H01M 8/0265
See application file for complete search history.

(56) References Cited

U.S. PATENT DOCUMENTS

| 7,195,831 B2* | 3/2007 | Sano | H01M 8/04753 429/437 |
| 2004/0115514 A1* | 6/2004 | Iwase | H01M 8/0258 429/434 |
| 2009/0162731 A1* | 6/2009 | Gaudillat | H01M 8/2483 429/457 |

FOREIGN PATENT DOCUMENTS

| JP | 4034804 B2 | 11/2007 |
| JP | 2008-004406 A | 1/2008 |
| JP | 2008-047395 A | 2/2008 |
| JP | 2014-078496 A | 5/2014 |
| KR | 10-0821773 B1 | 4/2008 |
| KR | 10-1279991 B1 | 7/2013 |

* cited by examiner

*Primary Examiner* — Eugenia Wang
(74) *Attorney, Agent, or Firm* — Rabin & Berdo, P.C.

(57) ABSTRACT

The present disclosure provides a separator for a fuel cell, including a central part with a rectangular shape, and a surrounding part disposed to surround the central part, wherein the surrounding part includes an outlet manifold positioned at a pair of edges of the central part, which are opposed each other, and an inlet manifold positioned along a side of the central part to be adjacent to another edge except for the pair of edges at which the outlet manifold is positioned, and the central part includes a plurality of guide patterns that are spaced apart from each other to guide fluids introduced through the inlet manifold toward the outlet manifold.

18 Claims, 10 Drawing Sheets

SEPARATOR FOR FUEL CELL INCLUDING GUIDE PATTERN AND FUEL CELL STACK INCLUDING THE SAME

CROSS-REFERENCE TO RELATED APPLICATION

This application claims under 35 U.S.C. § 119(a) the benefit of priority to Korean Patent Application No. 10-2018-0106095 filed on Sep. 5, 2018, the entire contents of which are incorporated herein by reference.

BACKGROUND

(a) Technical Field

The present disclosure relates to a fuel cell stack, and relates to a separator for a fuel cell including a guide pattern.

(b) Background Art

A solid oxide fuel cell (hereinafter, SOFC) may freely use future alternative fuel including existing hydrocarbon-series fuel such as natural gas, propane gas, or liquefied petroleum gas (LPG), biofuel, etc. as well as hydrogen via internal reforming without external reforming with high costs. In addition, the SOFC has received considerable attention as one of the most influential future power sources due to its high energy conversion efficiency.

A SOFC unit cell includes an air electrode, a fuel electrode, and an electrolyte positioned therebetween, and here, an oxidizing agent such as air or oxygen is supplied to the air electrode, and fuel such as hydrogen or hydrocarbon is supplied to the fuel electrode. When the air electrode and the fuel electrode are connected to an external circuit, oxygen is reduced in the air electrode due to an oxygen partial pressure difference between the air electrode and the fuel electrode, and oxygen ions are transmitted to the fuel electrode through the electrolyte that is an ionic conductor. In the fuel electrode, oxygen ions react with $H_2$ or CO fuel to generate $H_2O$, $CO_2$, and heat, and in this case, discharged electrons perform an electrical operation while being moved to the air electrode through the external circuit.

According to power demand, a plurality of SOFC unit cells are interconnected with each other to form a stack, and accordingly, a system with a capacity in a wide range from several watt (W) to MW or greater is configured, and thus, the SOFC may have various application ranges to power for family use, for building use, for transport use, and for massive electricity generation from a portable power source.

The SOFC unit cell is divided into a cylindrical type cell and a plate type cell according to a shape thereof. Efficiency of the SOFC unit cell may be determined based on fuel or oxygen transmitted from the outside. However, it is not easy to transmit fuel or oxygen toward a central portion of the SOFC unit cell, and thus, there is a problem in that the efficiency of the SOFC unit cell is lowered.

SUMMARY OF THE DISCLOSURE

In one aspect, the present disclosure provides a separator for a fuel cell including a guide pattern, for enhancing efficiency of a fuel cell using a guide pattern that is a group of segmented blocks to smoothly supply a fuel or oxygen to the center of a unit cell, and a fuel cell stack including the separator.

In another aspect, the present disclosure provides a separator for a fuel cell for enhancing the fluidity of fluids directed to the center of the unit cell.

In a preferred embodiment, a separator for a fuel cell includes a central part with a rectangular shape, and a surrounding part disposed to surround the central part, wherein the surrounding part includes outlet manifolds positioned at a pair of edges of the central part, which are opposed to each other, and inlet manifolds positioned along a side of the central part to be adjacent to another edge except for the pair of edges at which the outlet manifold is positioned, and the central part includes a plurality of guide patterns that are spaced apart from each other to guide fluids introduced through the inlet manifold toward the outlet manifold.

In another preferred embodiment, the guide patterns may include a plurality of sets of blocks that extend in a specific direction and are spaced apart from each other.

In another preferred embodiment, a cross section of the block, taken in a perpendicular direction to a thickness direction of the block, may be an oval shape or a rectangular shape.

In another preferred embodiment, the guide patterns may include a first guide pattern and a second guide pattern, first blocks constituting the first guide pattern may have a larger width than second blocks constituting the second guide patterns, and an interval between the first blocks may be larger than an interval between the second blocks.

In another preferred embodiment, the central part may be defined as a first region adjacent to the inlet manifold and a second region adjacent to the outlet manifold, the guide patterns may include inflow guide patterns provided in the first region and outflow guide patterns provided in the second region, and the inflow guide patterns and the outflow guide patterns may extend in different directions.

In another preferred embodiment, the outflow guide patterns may extend in a direction toward the outlet manifold.

In another preferred embodiment, the guide patterns may include a plurality of sets of blocks that extend in the same direction and are spaced apart from each other, and any one set of the inflow guide patterns may extend in parallel to a direction in which another set extends.

In another preferred embodiment, the inflow guide patterns may include a first inflow guide pattern and a second inflow guide pattern, the outflow guide patterns may include a first outflow guide pattern and a second outflow guide pattern, and the first inflow guide pattern and the second inflow guide pattern may extend in the same direction, and the first outflow guide pattern and the second outflow guide pattern may extend in different directions.

In another preferred embodiment, edges of the central part may be defined as a first edge, a second edge, a third edge, and a fourth edge in a clockwise direction, the inlet manifold may be provided in four number to be adjacent to the first edge and the third edge, which are opposed to each other in a diagonal line direction, among the edges of the central part, and the outlet manifold may be provided in two number to be adjacent to the second edge and the fourth edge among the edges of the central part.

In another preferred embodiment, the central part may include four sub central parts defined by a first symmetrical line and a second symmetrical line, which connect the edges, and each of the sub central parts may be defined as a first region adjacent to the inlet manifold and a second region adjacent to the outlet manifold.

In still another preferred embodiment, the guide patterns may include inflow guide patterns provided in the first region and outflow guide patterns provided in the second region, the inflow guide patterns may extend toward a boundary between the first region and the second region, and the outflow guide patterns may extend toward the outlet manifold.

In yet another preferred embodiment, the outlet manifold may be provided in plural number to be adjacent to the edges connected by the first symmetrical line, and the inflow guide patterns may be disposed in parallel to the second symmetrical line.

In still yet another preferred embodiment, the inflow guide patterns may be disposed in parallel to a direction obtained via rotation at a specific angle based on a direction in which the second symmetrical line extends.

In a further preferred embodiment, the inflow guide patterns may include a first inflow guide pattern and a second inflow guide pattern, the first inflow guide pattern may be disposed adjacent to the second symmetrical line compared with the second inflow guide pattern, and an interval between blocks constituting the second inflow guide pattern may be less than an interval between blocks constituting the first inflow guide pattern.

In another further preferred embodiment, the outflow guide patterns may include a first outflow guide pattern and a second outflow guide pattern, the first outflow guide pattern may be disposed adjacent to the first symmetrical line compared with the second outflow guide pattern, and an interval between the blocks constituting the second outflow guide pattern may be less than an interval between the blocks constituting the first outflow guide pattern.

The present disclosure may include a fuel cell stack. In a preferred embodiment, the fuel cell stack includes a unit cell including an air electrode, an electrolyte, and a fuel electrode, and a separator including a central part with a rectangular shape and a surrounding part disposed to surround the central part, wherein the unit cell and the separator are each provided in plural number and are alternately stacked, the surrounding part includes an outlet manifold positioned at a pair of edges of the central part, which are opposed to each other, and an inlet manifold positioned along a side of the central part to be adjacent to another edge except for the pair of edges at which the outlet manifold is positioned, and the central part includes a plurality of guide patterns that are spaced apart from each other to guide fluids introduced through the inlet manifold toward the outlet manifold.

In another preferred embodiment, the central part may include four sub central parts defined by a first symmetrical line and a second symmetrical line, which connect edges, each of the sub central parts may be defined as a first region adjacent to the inlet manifold and a second region adjacent to the outlet manifold, the guide patterns may include inflow guide patterns provided in the first region and outflow guide patterns provided in the second region, the inflow guide patterns may extend toward a boundary between the first region and the second region, and the outflow guide patterns may extend toward the outlet manifold.

In still yet another further preferred embodiment, the inflow guide patterns may include a first inflow guide pattern and a second inflow guide pattern, and the outflow guide patterns may include a first outflow guide pattern and a second outflow guide pattern, blocks constituting the first inflow guide pattern may have a different size from blocks constituting the second inflow guide pattern, and blocks constituting the first outflow guide pattern may have a different size from blocks constituting the second outflow guide pattern.

In a still further preferred embodiment, the first symmetrical line may be an imaginary line connecting the outlet manifolds disposed at the pair of edges, and an interval between the block constituting the first inflow guide pattern may be larger than an interval between the blocks constituting the second inflow guide pattern.

In a yet still further preferred embodiment, the first symmetrical line may be an imaginary line connecting the outlet manifolds disposed at the pair of edges, and an interval between the block constituting the first outflow guide pattern may be larger than an interval between the blocks constituting the second outflow guide pattern.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

The attached drawings for illustrating exemplary embodiments of the present disclosure are referred to in order to gain a sufficient understanding of the present disclosure, the merits thereof, and the objectives accomplished by the implementation of the present disclosure. The present disclosure may, however, be embodied in many different forms and should not be construed as being limited to the embodiments set forth herein; rather, these embodiments are provided so that this disclosure will be thorough and complete, and will fully convey the concept of the present disclosure to one of ordinary skill in the art. Like reference numerals in the drawings denote like elements.

Embodiments described in the specification will be described with reference to cross-sectional views and/or plan views that are ideal exemplary diagrams of the present disclosure. In the drawings, the thickness and size of a separator and regions are exaggerated for effective description of the technical information. Thus, the exemplary diagrams may be modified according to a manufacture technology and/or a tolerance, etc. Accordingly, the embodiments of the present disclosure include modified forms that are generated depending on a manufacture process rather being limited to a specific illustrated case. For example, a vertically illustrated etch region may be rounded or may be formed like a shape with a predetermined curvature. Accordingly, regions illustrated in the drawings have schematic attributes, and shapes of exemplary regions illustrated in the drawings are for the purpose of exemplifying a specific shape of a region of a device, but not limiting the scope of the present disclosure.

Figure 1:
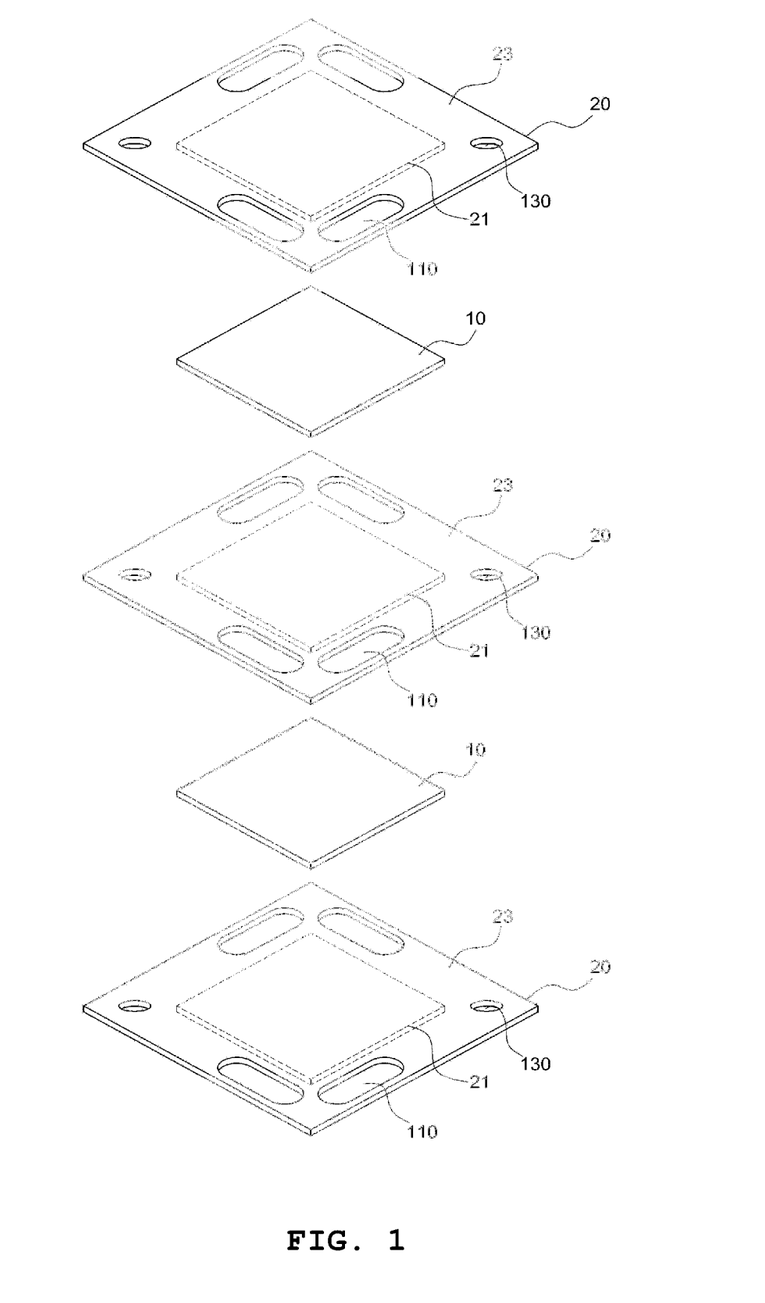
FIG. 1 is an exploded perspective view illustrating main parts of a fuel cell stack according to an embodiment of the present disclosure.
Figure 2:
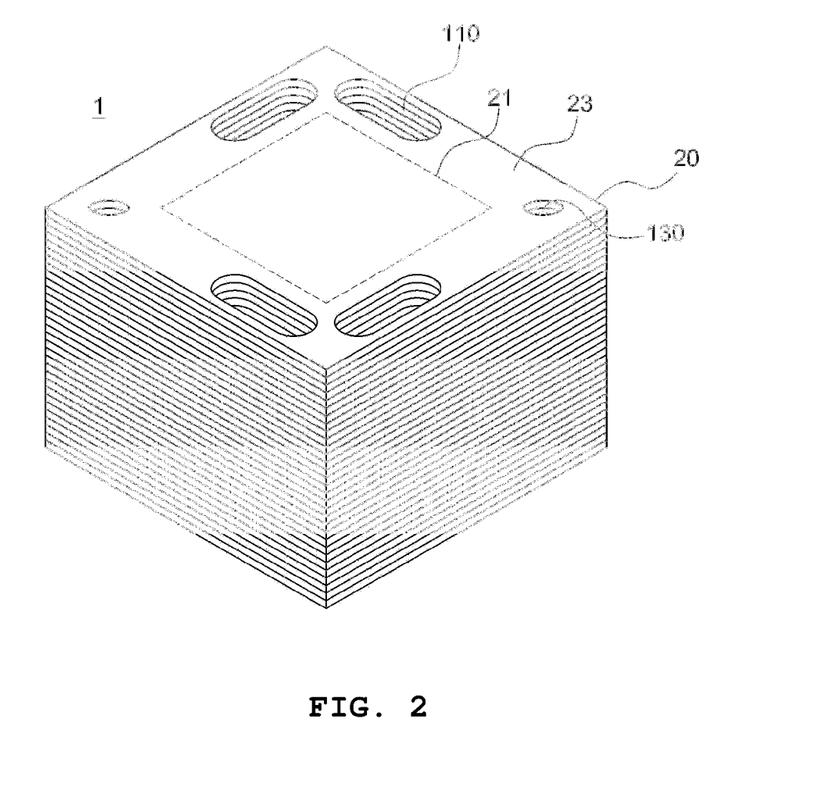
FIG. 2 is a perspective view of a fuel cell stack obtained by alternately stacking a unit cell and a separator of FIG. 1.

FIG. 1 is an exploded perspective view illustrating main parts of a fuel cell stack according to an embodiment of the present disclosure. FIG. 2 is a perspective view of a fuel cell stack obtained by alternately stacking a unit cell and a separator of FIG. 1.

Referring to FIGS. 1 and 2, a fuel cell stack 1 may have a structure in which a plurality of unit cells 10 and a plurality of separators 20 are alternately stacked. Each of the unit cells 10 may include an air electrode, an electrolyte layer, and a fuel electrode. For example, hydrogen supplied to the fuel electrode of one unit cell 10 may be divided into hydrogen ions and electrons, the electrons may be moved to the air electrode through an external circuit, and in the air electrode, oxygen may acquire electrons to be changed to oxygen ions. Oxygen ions may be moved to the fuel electrode through the electrolyte layer, and then, in the fuel electrode, the oxygen ions are combined with hydrogen ions to generate water that is a product. That is, one unit cell 10 may produce power via a chemical combination reaction, and the fuel electrode and the air electrode may function as a positive electrode and a negative electrode of the unit cell 10, respectively.

The fuel cell stack 1 may be classified into a polymer electrolyte membrane fuel cell (PEMFC), a phosphoric acid fuel cell (PAFC), an alkaline fuel cell (AFC), a molten carbonate fuel cell (MCFC), a solid oxide fuel cell (SOFC), and the like depending on a type of an electrolyte layer. The fuel cell stack 1 according to an embodiment of the present disclosure may include the aforementioned type of unit cell, and for example, may be a stack of a solid oxide fuel cell (SOFC).

The separator 20 may include a central part 21 corresponding to a position at which the unit cell 10 is disposed, and a surrounding part 23 disposed to surround the central part 21. The separator 20 may be disposed between the plurality of unit cells 10 to prevent a short circuit due to contact between the unit cells 10. The central part 21 may be electrically connected to the fuel electrode and the air electrode of the unit cell 10. A shape of the central part 21 may correspond to a shape of the unit cell 10. According to an embodiment of the present disclosure, the central part 21 may have a rectangular shape. In the surrounding part 23, an inlet manifold 110 into which fluids including fuel or oxygen are introduced, and an outlet manifold 130 from which fluids passing a surface of the unit cell 10 are discharged may be defined. The inlet manifold 110 and the outlet manifold 130 may be defined in the surrounding part 23 and may be configured in a plural number. The separator 20 may provide a flow passage through which a fuel or air flows to guide the fuel or air to be provided to the unit cell 10. The separator 20 may include a guide pattern (not shown) for guiding a fuel or air to be provided. The guide pattern (not shown) will be described below.

Figure 3:
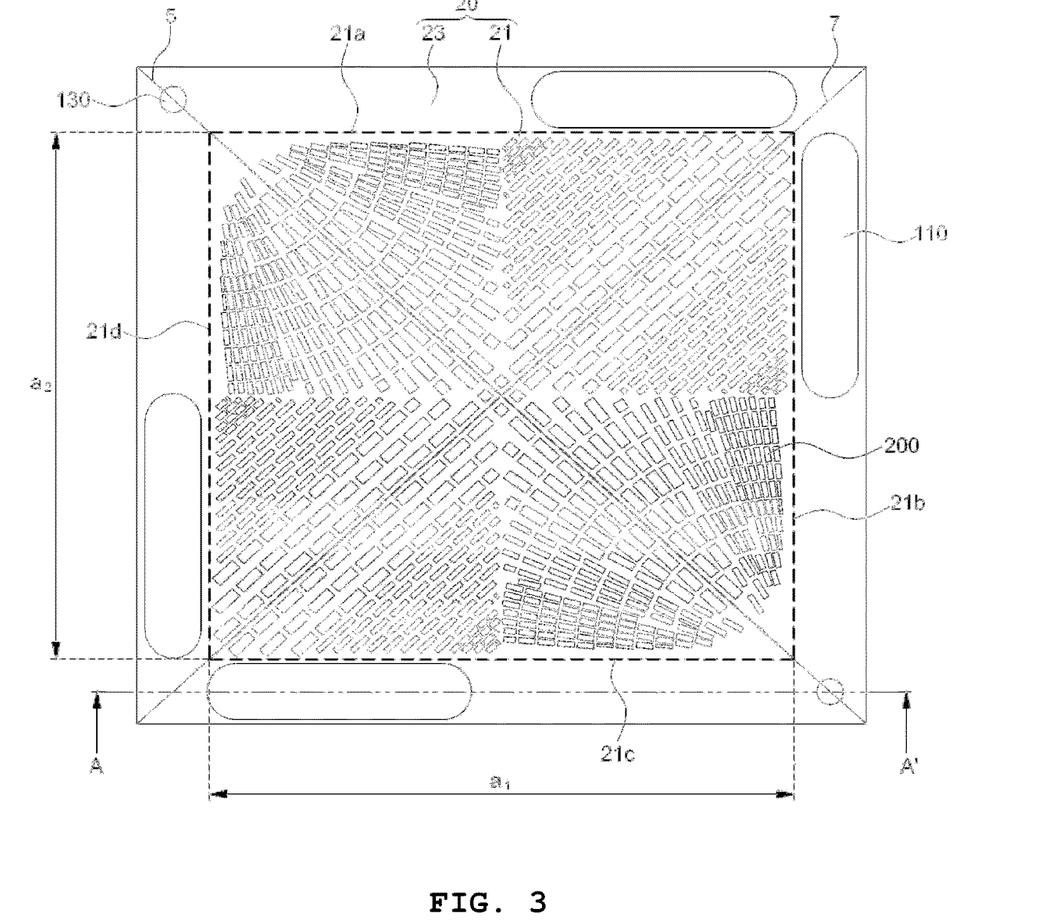
FIG. 3 is a plan view showing a separator according to an embodiment of the present disclosure.

FIG. 3 is a plan view showing a separator according to an embodiment of the present disclosure.

Referring to FIG. 3, the separator 20 may include the central part 21 and the surrounding part 23. The surrounding part 23 may include at least one outlet manifold 130 provided adjacent to any one edge of the central part 21, and at least one inlet manifold 110 provided adjacent to an edge except for the edge adjacent to the outlet manifold 130. For example, edges of the central part 21 may be defined as a first edge, a second edge, a third edge, and a fourth edge in a clockwise direction, respectively, the inlet manifold 110 may be provided in four number, and the outlet manifold 130 may be provided in two number. That is, the outlet manifolds 130 may be provided at a pair of edges (the first edge and the third edge) of the central part 21, which are opposed each other in a diagonal direction, respectively, and the four the inlet manifolds 110 may be provided at other edges (the second edge and the fourth edge) of the central part 21 except for the pair of edges (the first edge and the third edge) at which the outlet manifolds 130 are respectively provided. The inlet manifold 110 may be positioned along a side of the central part 21. The inlet manifold 110 and the outlet manifold 130 may be provided to be spaced apart from each other, and an interval between the inlet manifold 110 and the outlet manifold 130 may be half or more of the length of one side of the central part 21. Differently from the aforementioned example, the arrangement and interval between the inlet manifold 110 and the outlet manifold 130 may not be particularly limited.

The central part 21 may be divided into four sub central parts 21a, 21b, 21c, and 21d based on a first symmetrical line 5 and a second symmetrical line 7, which connect the edges. For example, the first symmetrical line 5 may be a line connecting the first edge and the third edge to each other, and the second symmetrical line 7 may be a line connecting the second edge and the fourth edge to each other. The first symmetrical line 5 may be defined as an imaginary line connecting the two outlet manifolds 130 to each other, and the first edge and the third edge may be a pair of edges at which the outlet manifolds 130 are disposed. The second symmetrical line 7 may be a line connecting edges (the second edge and fourth edge) except for a pair of edges adjacent to the outlet manifolds 130. The sub central parts 21a, 21b, 21c, and 21d may be classified into a first region adjacent to the inlet manifold 110 and a second region adjacent to the outlet manifold 130. That is, the first region may refer to an inlet region of fluids, which contacts the inlet manifold 110, and the second region may refer to an outlet region of fluids, which contacts the outlet manifold 130.

The central part 21 may include a plurality of guide patterns 200 that are spaced apart from each other to guide fluids introduced through the inlet manifold 110 to flow toward the outlet manifold 130. The guide patterns 200 may include a plurality of sets of blocks that extend in a specific direction and are spaced apart from each other. Blocks constituting one set may have the same size and shape, and blocks constituting different sets may have different sizes and shapes. That is, the guide patterns 200 may be formed to include blocks with different sizes. An interval between the sets of the blocks may be greater than the width of one block. Alternatively, the interval between the sets of the blocks may be smaller than the width of one block. The width of a block may refer to a length in a direction perpendicular to a direction in which blocks are arranged (that is, a direction in which a set of blocks extends). However, the size and shape of blocks included in the guide patterns 200 may not be limited to the aforementioned example.

The guide patterns 200 may be provided in different forms to the first region and the second region to allow fluids to flow to the outlet manifold 130 from the inlet manifold 110.

The sub central parts 21a, 21b, 21c, and 21d may include a first sub central part 21a, a second sub central part 21b, a third sub central part 21c, and a fourth sub central part 21d. For explanation based on the third sub central part 21c, the guide patterns 200 provided in the first region may extend toward a boundary between the first region and the second region from the inlet manifold 110, and the guide patterns 200 provided in the second region may extend toward the outlet manifold 130 from the boundary between the first region and the second region.

According to an embodiment of the present disclosure, the guide patterns 200 may be defined as a group of segmented blocks. Because the guide patterns 200 are formed in the groups of the segmented blocks, fluids may easily flow to the center of the unit cell 10. The guide patterns 200 according to an embodiment of the present disclosure may reduce flow resistance of fluids, and thus, may guide the fluids to easily flow to the center of the unit cell 10. Accordingly, the efficiency of a fuel cell including the unit cell 10 may be enhanced.

Figure 4:
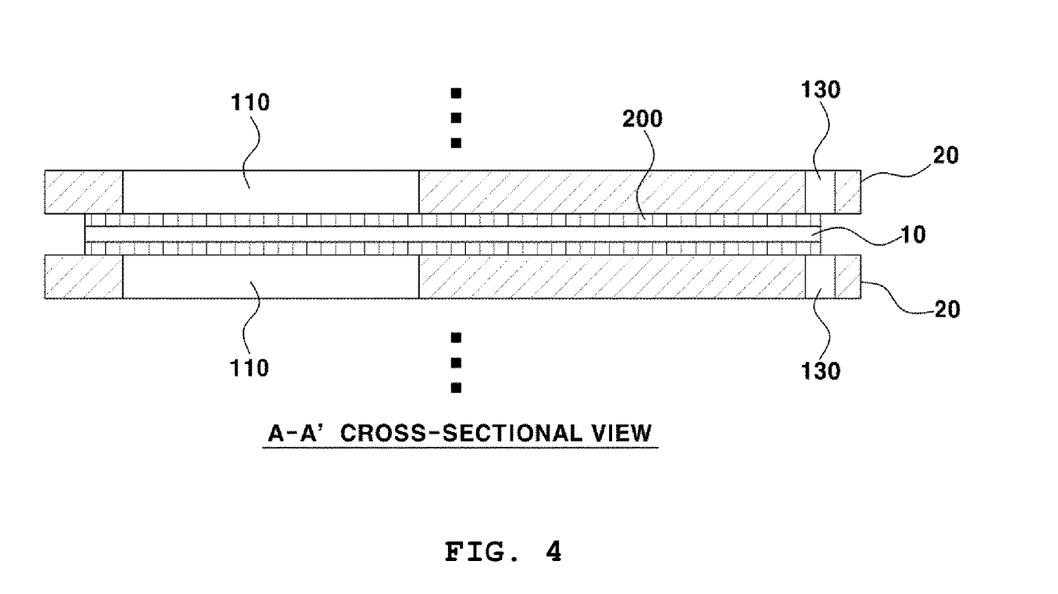
FIG. 4 is a cross-sectional view taken along A-A' of FIG. 3.

FIG. 4 is a cross-sectional view taken along A-A' of FIG. 3.

Referring to FIG. 4, the unit cell 10 may be disposed between the two separators 20. The separator 20 may include the guide patterns 200 that protrude toward the unit cell 10, and the guide patterns 200 may be physically and electrically connected to the unit cell 10.

The separator 20 may include the inlet manifold 110 into which fluids are introduced, and the outlet manifold 130 from which fluids are discharged. The inlet manifolds 110 that are provided in the separators 20 disposed above and below the unit cell 10 may be disposed to vertically overlap each other. The outlet manifolds 130 that are provided in the separators 20 disposed above and below the unit cell 10 may be disposed to vertically overlap each other. However, the arrangement and relationship of the inlet manifolds 110 and the outlet manifolds 130 that are provided in the separators 20 disposed above and below the unit cell 10 may be changed to change a direction of flow of fluids.

According to an embodiment of the present disclosure, counter-flow in which the inlet manifolds 110 and the outlet manifolds 130 are arranged to introduce fluids in opposite directions into the separators 20 disposed above and below the unit cell 10, and cross-flow in which the inlet manifolds 110 and the outlet manifolds 130 are arranged to introduce fluids in perpendicular directions into the separators 20 disposed above and below the unit cell 10 may be applied.

Figure 5:
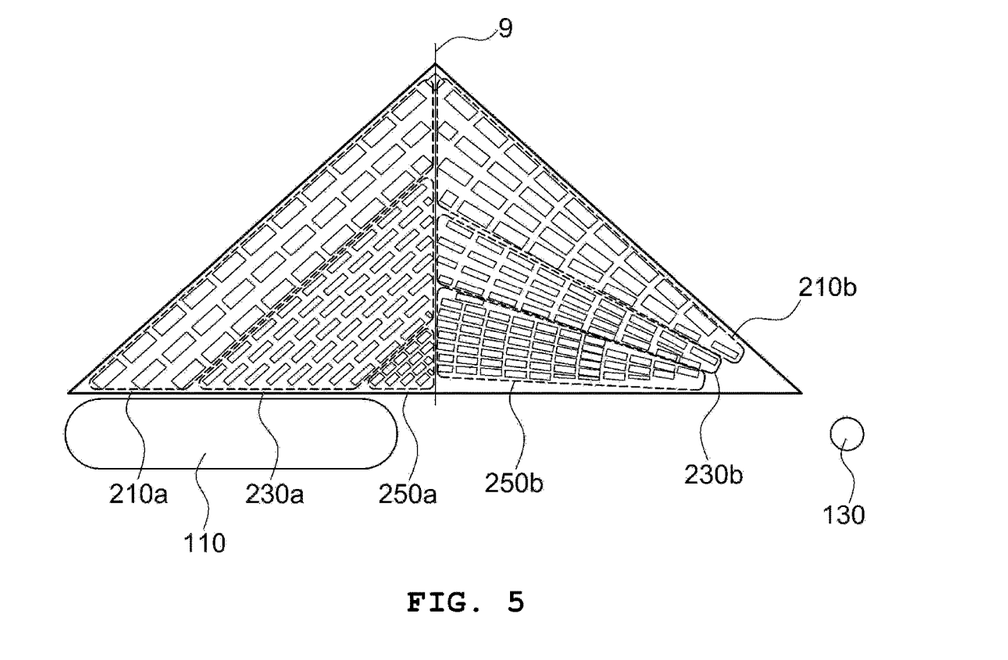
FIG. 5 is a plan view showing a portion of the separator of FIG. 3.

FIG. 5 is a plan view showing a portion of the separator of FIG. 3. FIG. 5 shows the third sub central part 21c of FIG. 3. Hereinafter, the guide patterns 200 will be described based on the third sub central part 21c.

Referring to FIGS. 3 and 5, the third sub central part 21c may be divided into a first region and a second region based on a third symmetrical line 9. The first region may be a region adjacent to the inlet manifold 110, and the second region may be a region adjacent to the outlet manifold 130. The third symmetrical line 9 may be a line connecting sides of the central part 21.

The guide patterns 200 may be arranged in different forms in the first region and the second region. The guide patterns 200 may include inflow guide patterns 210a, 230a, and 250a disposed in the first region, and outflow guide patterns 210b, 230b, and 250b disposed in the second region.

The inflow guide patterns 210a, 230a, and 250a may extend toward the third symmetrical line 9 from the inlet manifold 110. Sets of blocks constituting the inflow guide patterns 210a, 230a, and 250a may be arranged in parallel to each other. For example, the sets of the blocks constituting the inflow guide patterns 210a, 230a, and 250a may extend in parallel to the second symmetrical line 7. The inflow guide patterns 210a, 230a, and 250a may include a first inflow guide pattern 210a, a second inflow guide pattern 230a, and a third inflow guide pattern 250a. The first inflow guide pattern 210a may be disposed adjacent to the second symmetrical line 7 compared with the second inflow guide pattern 230a, and the second inflow guide pattern 230a may be disposed adjacent to the second symmetrical line 7 compared with the third inflow guide pattern 250a. The first inflow guide pattern 210a, the second inflow guide pattern 230a, and the third inflow guide pattern 250a may extend in parallel to each other. However, directions in which the first inflow guide pattern 210a, the second inflow guide pattern 230a, and the third inflow guide pattern 250a extend may not be particularly limited. Blocks that respectively constitute the first inflow guide pattern 210a, the second inflow guide pattern 230a, and the third inflow guide pattern 250a may have different sizes. For example, a block constituting the first inflow guide pattern 210a may have a larger size than that of the second inflow guide pattern 230a, and a block constituting the second inflow guide pattern 230a may have a larger size than that of the third inflow guide pattern 250a. However, the sizes of the blocks constituting the first inflow guide pattern 210a, the second inflow guide pattern 230a, and the third inflow guide pattern 250a may not be particularly limited, and the size of the block constituting the third inflow guide pattern 250a may be designed to be larger than the size of the block constituting the first inflow guide pattern 210a. The blocks constituting each of the first inflow guide pattern 210a, the second inflow guide pattern 230a, and the third inflow guide pattern 250a may constitute a set that extends in the same direction. That is, each of the first inflow guide pattern 210a, the second inflow guide pattern 230a, and the third inflow guide pattern 250a may be defined as a group of sets that extend in a specific direction. Intervals between the sets that respectively constitute the first inflow guide pattern 210a, the second inflow guide pattern 230a, and the third inflow guide pattern 250a may be different from each other. For example, an interval between the sets constituting the first inflow guide pattern 210a may be larger than an interval of the sets constituting the second inflow guide pattern 230a, and an interval between the sets constituting the second inflow guide pattern 230a may be larger than an interval between the sets constituting the third inflow guide pattern 250a. That is, an interval between sets with a relatively large block may be larger than an interval between sets with a relatively small block. An interval between blocks constituting inflow guide patterns disposed adjacent to the second symmetrical line 7 among the inflow guide patterns 210a, 230a, and 250a may be larger than an interval between blocks constituting inflow guide patterns disposed away from the second symmetrical line 7. Differently from the aforementioned example, an interval between sets with a relatively large block may be smaller than an interval between sets with a relatively small block, and the interval between sets and the size of blocks may be designed in various ways.

The outflow guide patterns 210b, 230b, and 250b may extend toward the outlet manifold 130 from the third symmetrical line 9. Sets of blocks constituting the outflow guide patterns 210b, 230b, and 250b may not be parallel to each other. The outflow guide patterns 210b, 230b, and 250b may include a first outflow guide pattern 210b, a second outflow guide pattern 230b, and the third outflow guide pattern 250b. The first outflow guide pattern 210b, the second outflow guide pattern 230b, and a third outflow guide pattern 250b may extend toward the outlet manifold 130. The first outflow guide pattern 210b may be disposed adjacent to the first symmetrical line 5 compared with the second outflow guide pattern 230b, and the second outflow guide pattern 230b may be disposed adjacent to the first symmetrical line 5 compared with the third outflow guide pattern 250b. Blocks that respectively constitute the first outflow guide pattern 210b, the second outflow guide pattern 230b, and the third outflow guide pattern 250b may have different sizes. For example, the blocks constituting the first outflow guide pattern 210b may have a larger size than the blocks constituting the second outflow guide pattern 230b, and the blocks constituting the second outflow guide pattern 230b may have a larger size than the blocks constituting the third outflow guide pattern 250b. However, the sizes of the blocks constituting the first outflow guide pattern 210b, the second outflow guide pattern 230b, and the third outflow guide pattern 250b may not be particularly limited, and the size of the blocks constituting the third outflow guide pattern 250b may be designed to be larger than the size of the blocks constituting the first outflow guide pattern 210b. The blocks that respectively constitute the first outflow guide pattern 210b, the second outflow guide pattern 230b, and the third outflow guide pattern 250b may constitute sets that extend in the same direction. That is, each of the first outflow guide pattern 210b, the second outflow guide pattern 230b, and the third outflow guide pattern 250b may be defined as a group of sets that extend in a specific direction. Intervals between sets that respectively constitute the first outflow guide pattern 210b, the second outflow guide pattern 230b, and the third outflow guide pattern 250b may be different from each other. For example, an interval between the sets constituting the first outflow guide pattern 210b may be larger than an interval of the sets constituting the second outflow guide pattern 230b, and an interval between the sets constituting the second outflow guide pattern 230b may be larger than an interval between the sets constituting the third outflow guide pattern 250b. That is, an interval between sets with a relatively large block may be larger than an interval between sets with a relatively small block. An interval between blocks constituting inflow guide patterns disposed adjacent to the first symmetrical line 5 among the outflow guide patterns 210b, 230b, and 250b may be larger than an interval between blocks constituting inflow guide patterns disposed away from the first symmetrical line 5. Differently from the aforementioned example, an interval between sets with a relatively large block may be smaller than an interval between sets with a relatively small block, and the interval between sets and the size of blocks may be designed in various ways.

According to an embodiment of the present disclosure, flow resistance may be controlled by adjusting the arrangement of the guide patterns 200 and an interval between the blocks constituting the guide patterns 200 to allow fluids to smoothly flow to the center of the separator 20. In the first region, an interval between the blocks constituting an inflow guide pattern adjacent to the second symmetrical line 7 may be designed to be larger than an interval between the blocks constituting the inflow guide pattern disposed away from the second symmetrical line 7, and, in the second region, an interval between the blocks constituting a outflow guide pattern adjacent to the first symmetrical line 5 may be designed to be larger than an interval between the blocks constituting a outflow guide pattern disposed away from the first symmetrical line 5. Flow resistance may be proportional to the length of a flow passage and may be inversely proportional to a cross section of the flow passage. A large amount of fluids may flow toward a flow passage with a wide interval between blocks, and a relatively small amount of fluids may flow toward a flow passage with a narrow interval between blocks. Accordingly, fluids may easily flow to the center of the unit cell 10 through the guide patterns 200 with different intervals between blocks.

According to an embodiment of the present disclosure, fluids introduced through the inlet manifold 110 may flow to the outlet manifold 130 by the first inflow guide pattern 210a and the first outflow guide pattern 210b. In addition, fluids introduced through the inlet manifold 110 may flow to the outlet manifold 130 by the second inflow guide pattern 230a and the second outflow guide pattern 230b, and fluids introduced through the inlet manifold 110 may flow to the outlet manifold 130 by the third inflow guide pattern 250a and the third outflow guide pattern 250b. To allow fluids introduced through the inlet manifold 110 to easily flow to the center of the unit cell 10 of FIG. 1, the size of blocks constituting the first inflow guide pattern 210a that extend toward the center of the central part 21 may be designed to be larger than the size of blocks constituting the second inflow guide pattern 230a and the third inflow guide pattern 250a. Therethrough, a problem in that fluids flow only in an external part of the central part 21 rather than flowing to the center of the central part 21 may be overcome.

Differently from the aforementioned example, fluids flowing through the first inflow guide pattern 210a may not always flow to the outlet manifold 130 by the first outflow guide pattern 210b, fluids flowing through the second inflow guide pattern 230a may not always flow to the outlet manifold 130 by the second outflow guide pattern 230b fluids flowing through the third inflow guide pattern 250a may not always flow to the outlet manifold 130 by the third outflow guide pattern 250b.

According to an embodiment of the present disclosure, blocks constituting the first inflow guide pattern 210a and blocks constituting the first outflow guide pattern 210b may be designed to be the same, blocks constituting the second inflow guide pattern 230a and blocks constituting the second outflow guide pattern 230b may be designed to be the same, and blocks constituting the third inflow guide pattern 250a and blocks constituting the third outflow guide pattern 250b may be designed to be the same, and accordingly, fluids passing through the separator 20 may smoothly flow.

Differently from the aforementioned example, according to an embodiment of the present disclosure, the guide patterns 200 may include blocks with the same size, and the guide patterns 200 may include a first inflow guide pattern, a second inflow guide pattern, a first outflow guide pattern, and a second outflow guide pattern, which are configured using two different blocks. That is, the size of blocks constituting the guide patterns 200 may not be particularly limited, and an interval between blocks constituting the guide patterns 200 may not be particularly limited. The number of guide patterns provided in the first region and the number of guide patterns provided in the second region may be different from each other. For example, the first guide pattern and the second guide pattern including blocks with different sizes may be provided in the first region, and the first guide pattern, the second guide pattern, and the third guide pattern including blocks with different sizes may be provided in the second region.

Figure 6A:
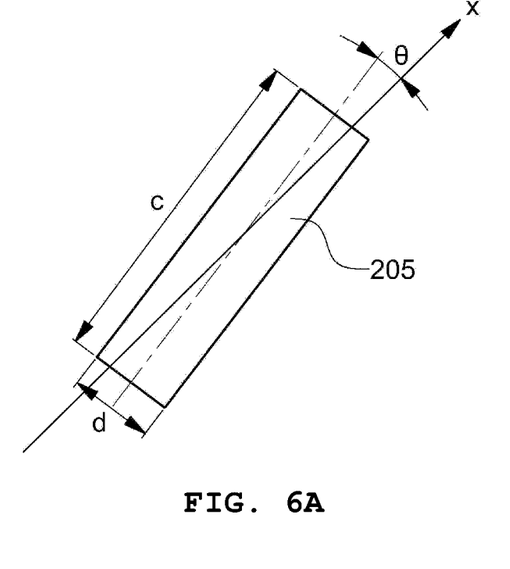
FIGS. 6A to 6C are diagrams showing a block constituting a guide pattern according to an embodiment of the present disclosure.
Figure 6B:
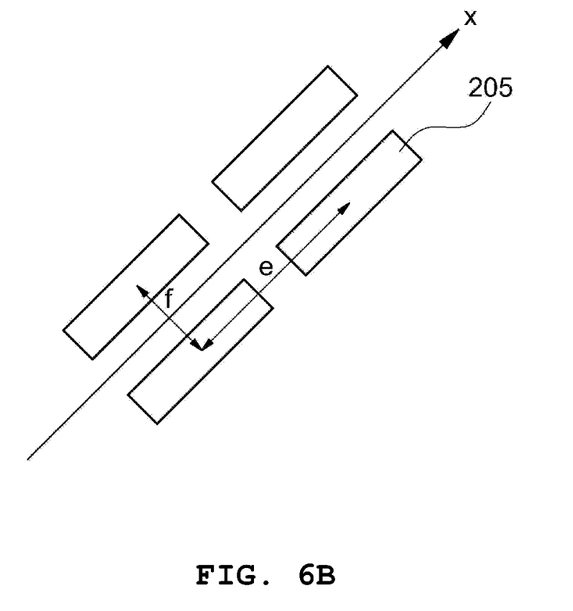
Figure 6C:
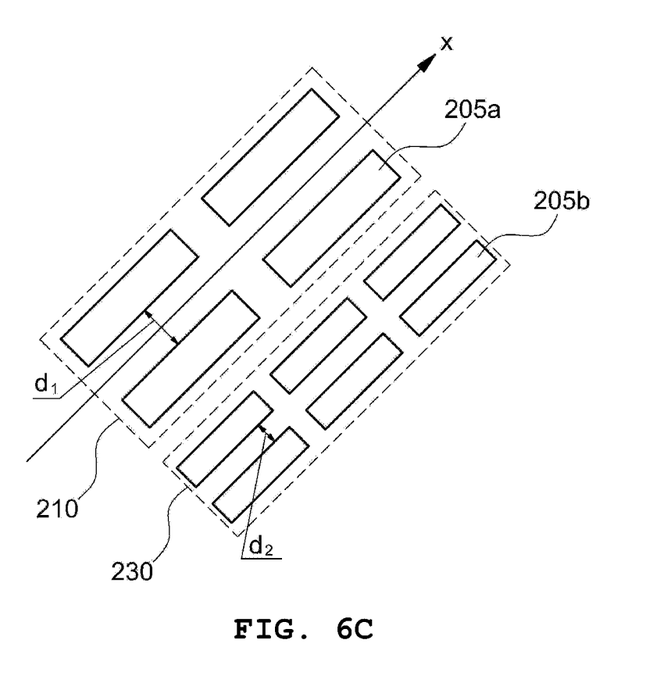

FIGS. 6A to 6C are diagrams showing a block constituting a guide pattern according to an embodiment of the present disclosure.

Referring to FIGS. 3, 5, and 6A, a block 205 constituting the guide patterns 200 may have a rectangular shape that extends in direction x. That is, a cross section taken in a thickness direction of the block 205 may be a rectangular shape. Here, the thickness direction of the block 205 may refer to a direction toward the unit cell 10 from the separator 20 of FIG. 4. Direction x may refer to a direction of a stream-line that flows on the separator 20. For example, the longest side among sides of the block 205 with a rectangular shape may refer to a length c of the block 205, and a length direction of the block 205 may be disposed in parallel to a direction in which the stream-line extends. A direction perpendicular to the longest length c may correspond to a width d of the block 205. As another example, a direction of the length c of the block 205 with a rectangular shape may have a predetermined angle e with respect to the stream-line direction x.

According to an embodiment of the present disclosure, the central part 21 of the separator 20 may have a rectangular shape, and in this case, the length of one side of the central part 21 may be a first length a1, and the length of the other side may be a second length a2. The length c, the width c, and the predetermined angle e of the block 205 may be defined according to the following expressions.

$$0 < \frac{c}{\sqrt{a1^2 + a2^2}} < 0.5 \qquad \text{[Expression 1]}$$

$$0 < \frac{d}{\sqrt{a1^2 + a2^2}} < 0.25 \qquad \text{[Expression 2]}$$

$$-\frac{\pi}{4} < \theta < \frac{\pi}{4} \qquad \text{[Expression 3]}$$

The length c of the block 205 may be less than half of the length of a diagonal line of the central part 21, and the width d of the block 205 may be less than ¼ of the length of a diagonal line of the central part 21.

The predetermined angle θ may be greater than −45° and may be less than 45° based on the stream-line direction x. The length c of the block 205 may be twice the width d, but is not particularly limited.

Referring to FIGS. 3, 5, and 6B, a first spacing distance e in a length direction and a second spacing distance f in a width direction may be defined between the two blocks 205 adjacent to each other. Each of the first spacing distance e and the second spacing distance f may be defined as a distance from the center of one block to the center of another adjacent block. The first spacing distance e and the second spacing distance f may be defined as follows.

$$0 < \frac{e}{\sqrt{a1^2 + a2^2}} < 0.5 \qquad \text{[Expression 4]}$$

$$0 < \frac{f}{\sqrt{a1^2 + a2^2}} < 0.25 \qquad \text{[Expression 5]}$$

The first spacing distance e may be less than a half of the length of a diagonal line of the central part 21, the second spacing distance f may be less than ¼ of the length of the diagonal line of the central part 21.

Referring to FIGS. 3, 5, and 6C, the guide patterns 200 may include a group of blocks with different sizes. For example, the guide patterns 200 may include a first guide pattern 210 and a second guide pattern 230. The first guide pattern 210 may refer to the first inflow guide pattern 210a of FIG. 5, and the second guide pattern 230 may refer to the second inflow guide pattern 230a of FIG. 5.

Blocks 205a and 205b constituting the first guide pattern 210 and the second guide pattern 230 may extend in parallel to the stream-line direction x. Blocks that extend in the stream-line direction x may be defined as a set of blocks. A first block 205a constituting the first guide pattern 210 may have a larger length and width than a second block 205b constituting the second guide pattern 230. An interval between the first blocks 205a adjacent to each other may be defined as a first interval d1, and an interval between the second blocks 205b may be defined as a second interval d2. That is, an interval between sets of the first blocks may be defined as the first interval d1, and an interval between sets of the second blocks may be defined as the second interval d2. To enhance the fluidity of fluids introduced into a separator, the first interval d1 may be larger than the second interval d2. As the size of the block is increased, an interval between the bocks may be increased, and accordingly, the fluidity of fluids may be enhanced. However, an interval between blocks may be set irrespective of the size of a block.

According to an embodiment of the present disclosure, the guide patterns 200 may include blocks with different sizes and may be provided with different intervals between blocks. Blocks may be arranged to widen an interval between blocks at a portion with degraded fluidity of fluids and to narrow an interval between blocks at a portion with high fluidity of fluids, and accordingly, fluids may smoothly flow to the center of the unit cell.

Figure 7A:
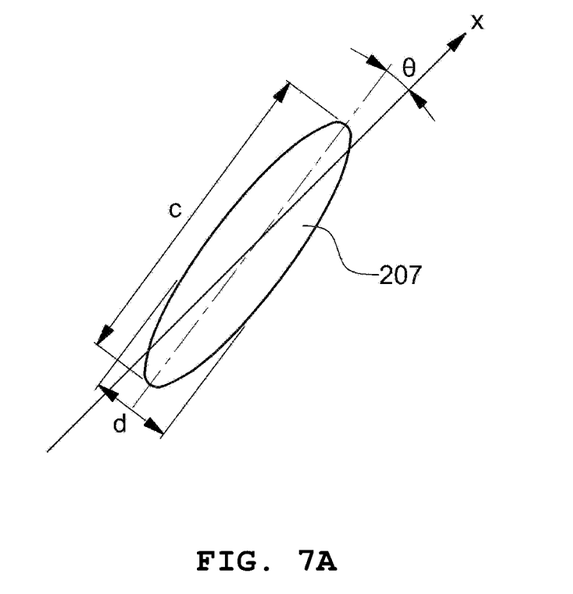
FIGS. 7A to 7C are diagrams showing a block constituting a guide pattern according to another embodiment of the present disclosure.
Figure 7B:
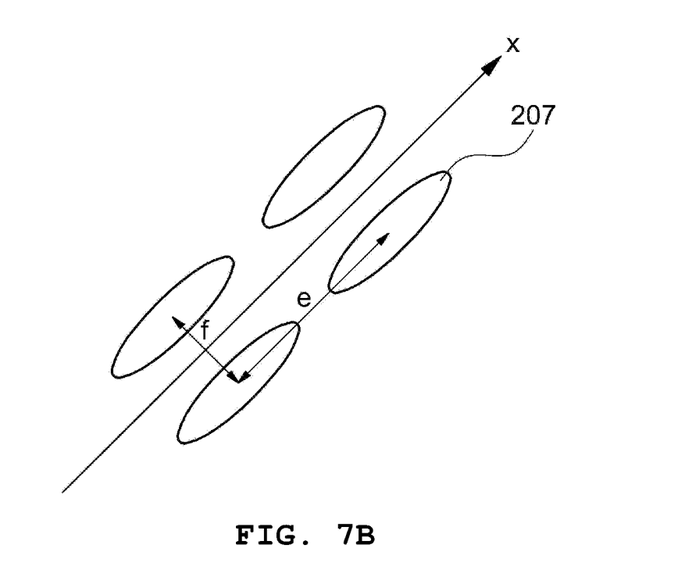
Figure 7C:
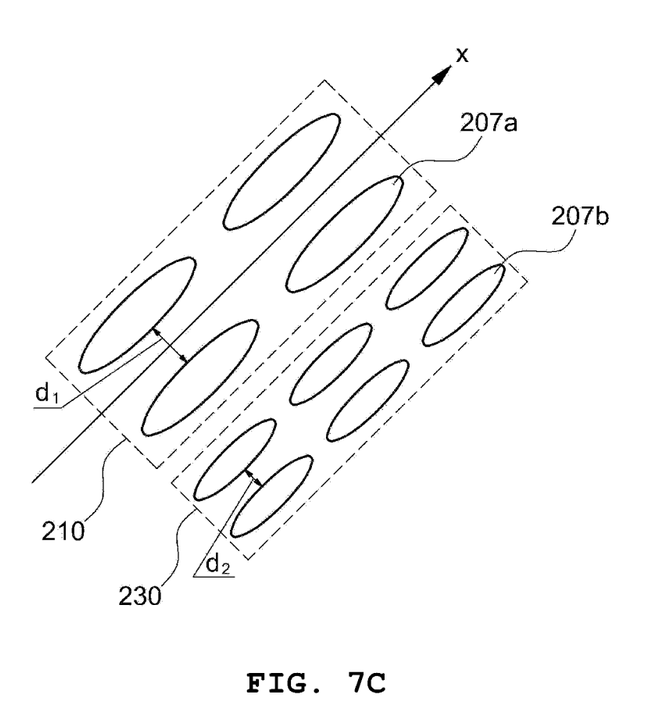

FIGS. 7A to 7C are diagrams showing a block constituting a guide pattern according to another embodiment of the present disclosure.

Referring to FIGS. 3, 5, and 7A, a block 207 constituting the guide patterns 200 may have an oval shape that extends in direction x. That is, a cross section taken in a thickness direction of the block 207 may have an oval shape. The thickness direction of the block 207 may refer to a direction toward the unit cell 10 from the separator 20 of FIG. 4. Direction x may refer to a direction of a stream-line that flows on the separator 20. For example, a long axis c of the block 207 may be disposed in parallel to a direction in which the stream-line extends. As another example, the long axis c of the block 207 may be disposed to have a predetermined angle e with respect to the stream-line direction x.

According to an embodiment of the present disclosure, the central part 21 of the separator 20 may have a rectangular shape, and in this case, the length of one side of the central part 21 may be the first length a1, and the length of the other side may be the second length a2. The long axis c, a short axis d, and the predetermined angle θ of the block 207 may be defined according to the following expressions.

$$0 < \frac{c}{\sqrt{a1^2 + a2^2}} < 0.5 \qquad \text{[Expression 6]}$$

$$0 < \frac{d}{\sqrt{a1^2 + a2^2}} < 0.25 \qquad \text{[Expression 7]}$$

$$-\frac{\pi}{4} < \theta < \frac{\pi}{4} \qquad \text{[Expression 8]}$$

The long axis c of the block 207 may be less than a half of the length of a diagonal line of the central part 21, and the short axis d of the block 205 may be less than ¼ of the length of the diagonal line of the central part 21.

The predetermined angle θ may be greater than −45° and may be less than 45° based on the stream-line direction x. The length of the long axis c of the block 207 may be twice the length of the short axis d, but may not be particularly limited.

Referring to FIGS. 3, 5, and 7B, the first spacing distance e in a length direction and the second spacing distance f in a width direction may be defined between two blocks 207 adjacent to each other. Each of the first spacing distance e and the second spacing distance f may be defined as a distance from the center of one block to the center of another adjacent block. The first spacing distance e and the second spacing distance f may be defined as follows.

$$0 < \frac{e}{\sqrt{a1^2 + a2^2}} < 0.5 \qquad \text{[Expression 9]}$$

$$0 < \frac{f}{\sqrt{a1^2 + a2^2}} < 0.25 \qquad \text{[Expression 10]}$$

The first spacing distance e may be less than a half of the length of a diagonal line of the central part 21, and the second spacing distance f may be less than ¼ of the length of the diagonal line of the central part 21.

Referring to FIGS. 3, 5, and 7C, the guide patterns 200 may include a group of blocks with different sizes. For example, the guide patterns 200 may include the first guide pattern 210 and the second guide pattern 230. The first guide pattern 210 may refer to the first inflow guide pattern 210a of FIG. 5, and the second guide pattern 230 may refer to the second inflow guide pattern 230a of FIG. 5.

Blocks 207a and 207b constituting the first guide pattern 210 and the second guide pattern 230 may extend in parallel to the stream-line direction x. Blocks that extend in the stream-line direction x may be defined as a set of blocks.

A first block 207a constituting the first guide pattern 210 may have a larger length and width than a second block 207b. An interval between the first blocks 207a adjacent to each other may be defined as the first interval d1, and an interval between the second blocks 207b may be defined as the second interval d2. That is, an interval between sets of the first blocks may be defined as the first interval d1, and an interval between sets of the second blocks may be defined as the second interval d2. To enhance the fluidity of fluids introduced into a separator, the first interval d1 may be larger than the second interval d2. As the size of the block is increased, an interval between the bocks may be increased, and accordingly, the fluidity of fluids may be enhanced. However, an interval between blocks may be set irrespective of the size of a block.

Figure 8:
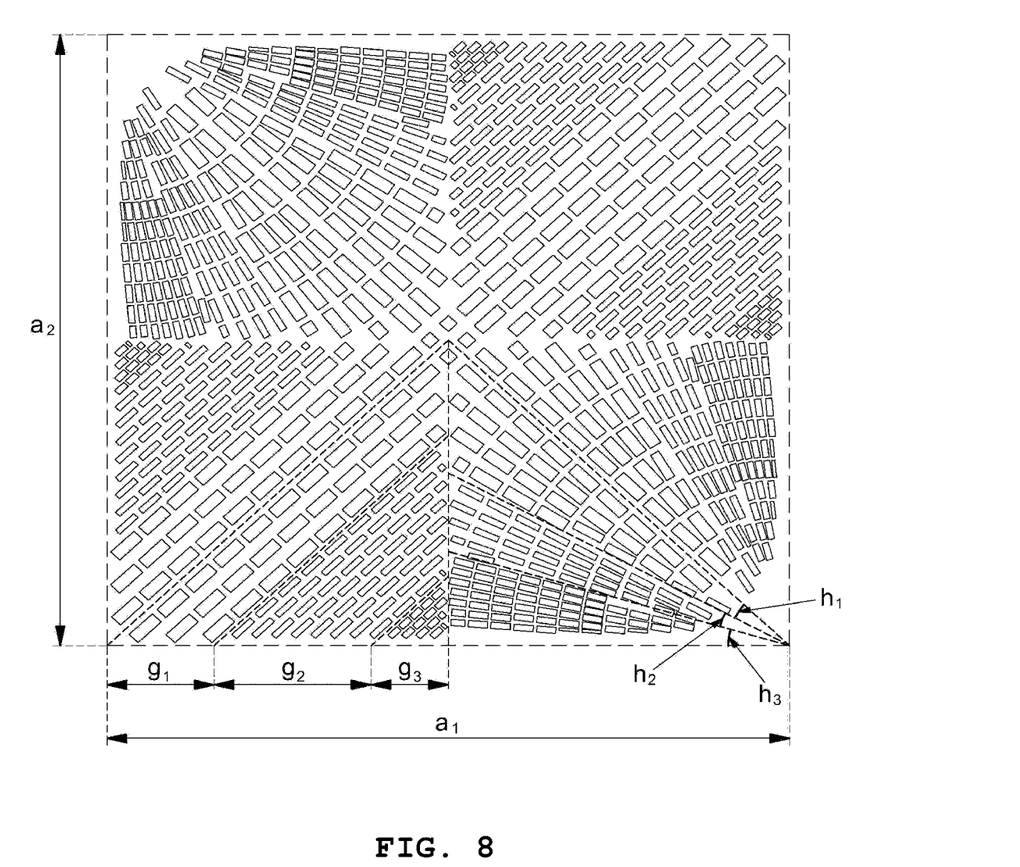
FIG. 8 is a diagram for explanation of arrangement of guide patterns according to an embodiment of the present disclosure.

FIG. 8 is a diagram for explanation of arrangement of guide patterns according to an embodiment of the present disclosure. With reference to FIG. 8, the case in which the central part 21 has a square shape will be described.

Referring to FIGS. 3, 5, 6A, 6B, and 8, guide patterns may include the first inflow guide pattern 210a, the second inflow guide pattern 230a, and the third inflow guide pattern 250a, which are disposed in the first region, and the first outflow guide pattern 210b, the second outflow guide pattern 230b, and the third outflow guide pattern 250b, which are disposed in the second region.

The first inflow guide pattern 210a may be disposed in a first sub region, the second inflow guide pattern 230a may be disposed in a second sub region, and the third inflow guide pattern 250a may be disposed in a third sub region. Based on one side of the central part 21 with the first length a1, the first sub region may have a first sub length g1, the second sub region may have a second sub length g2, and the third sub region may have a third sub length g3. In this case, conditions of values of the first sub length g1, the second sub length g2, and the third sub length g3 may be represented according to the following expressions.

$$\sum \frac{gi}{a1} = 0.5 \qquad \text{[Expression 11]}$$

where i is a natural number equal to or greater than 1.

$$0 < \frac{gi}{a1} \leq 0.5 \qquad \text{[Expression 12]}$$

Here, a1 may refer to a first length of the central part 21. In addition, i may refer to the number of guide patterns disposed in the first region. That is, according to the present embodiment, i may have a value of 3. According to the above expressions, the sub lengths g1, g2, and g3 may be less than a half of the first length a1.

The first outflow guide pattern 210b may be disposed in a fourth sub region, the second outflow guide pattern 230b may be disposed in a fifth sub region, and the third outflow guide pattern 250b may be disposed in a sixth sub region. Based on an edge adjacent to the outlet manifold 130, the fourth sub region may have a first angle h1, the fifth sub region may have a second angle h2, and the sixth sub region may have a third angle h3. Conditions of values of the first angle h1, the second angle h2, and the third angle h3 may be represented according to the following expression.

$$\sum hj = \frac{\pi}{4} \qquad \text{[Expression 17]}$$

where j is a natural number equal to or greater than 1.

Here, j may refer to the number of guide patterns disposed in the second region. That is, according to the present embodiment, j may have a value of 3. According to an embodiment of the present disclosure, the number of guide patterns disposed in the first region and the number of guide patterns disposed in the second region may have the same value, 3. However, the number of guide patterns disposed in the first region and the number of guide patterns disposed in the second region may be different from each other, and i and j may have different values.

Figure 9:
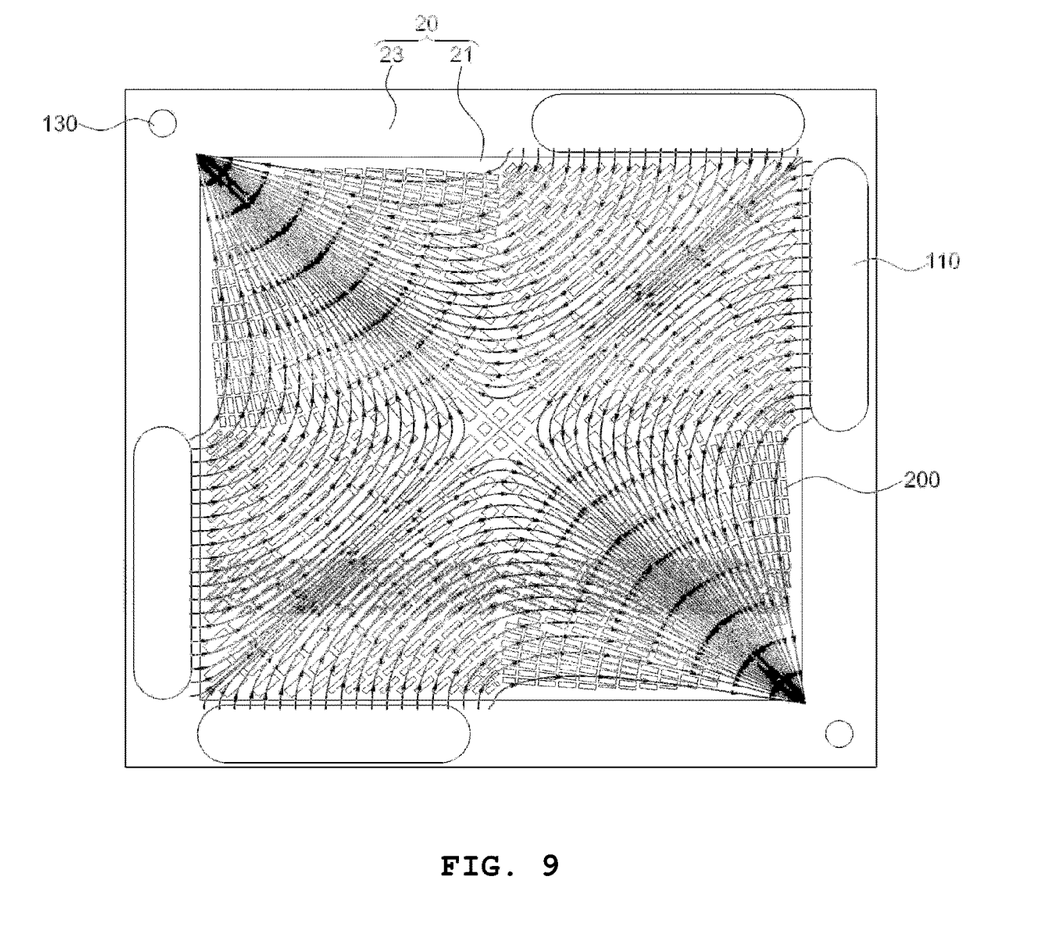
FIG. 9 is a diagram for explanation of flow of fluid supply by a separator according to an embodiment of the present disclosure.

FIG. 9 is a diagram for explanation of flow of fluid supply by a separator according to an embodiment of the present disclosure.

As seen from FIG. 9, fluids flow to the center of the separator 20 may the guide patterns 200 provided in the separator 20. In general, there is a problem in that fluids flow in an external part of the separator 20 and are discharged to lower efficiency of a fuel cell. However, according to an embodiment of the present disclosure, the guide patterns 200 may include blocks with different sizes in consideration of the fluidity of fluids, blocks may be arranged to relatively widen an interval between blocks to allow fluids to flow to the center of the separator 20, and to narrow an interval between blocks to allow fluids to flow to the external part of the separator 20.

Accordingly, fluids introduced through the inlet manifold 110 may flow in both the external part of the separator 20 and the central portion of the separator 20 and then may be discharged through the outlet manifold 130, thereby enhancing efficiency of a fuel cell.

According to an embodiment of the present disclosure, because guide patterns are formed in groups of segmented blocks, fluids may easily flow to the center of a unit cell. Accordingly, efficiency of a fuel cell stack including a unit cell may be enhanced.

According to an embodiment of the present disclosure, guide patterns may include blocks with different sizes, and an interval between blocks may be provided in different ways. Blocks may be arranged to widen an interval between blocks at a portion with degraded fluidity of fluids and to narrow an interval between blocks at a portion with high fluidity of fluids, and accordingly, fluids may smoothly flow to the center of the unit cell.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. A separator for a fuel cell, comprising:
a central part with a rectangular shape; and
a surrounding part disposed to surround the central part, wherein:
the surrounding part includes an outlet manifold positioned at a pair of corners of the central part, which are opposed to each other, and an inlet manifold positioned along a side of the central part to be adjacent to another corner except for the pair of corners at which the outlet manifold is positioned; and
the central part includes a plurality of guide patterns that are spaced apart from each other to guide fluids introduced through the inlet manifold toward the outlet manifold,
wherein corners of the central part are defined as a first corner, a second corner, a third corner, and a fourth corner in a clockwise direction;
the inlet manifold is provided to be adjacent to the first corner and the third corner, which are opposed to each other in a diagonal line direction, among the corners of the central part; and
the outlet manifold is provided to be adjacent to the second corner and the fourth corner among the corners of the central part,
the central part includes four sub central parts defined by a first symmetrical line and a second symmetrical line, which connect the corners; and
each of the sub central parts is defined as a first region adjacent to the inlet manifold and a second region adjacent to the outlet manifold.

2. The separator for a fuel cell of claim 1, wherein the plurality of guide patterns include a plurality of sets of blocks that extend in a specific direction and are spaced apart from each other.

3. The separator for a fuel cell of claim 2, wherein a cross section of the block, taken in a perpendicular direction to a thickness direction of the block, is an oval shape or a rectangular shape.

4. The separator for a fuel cell of claim 1, wherein:
the plurality of guide patterns include a first guide pattern and a second guide pattern;

first blocks constituting the first guide pattern have a larger width than second blocks constituting the second guide patterns; and
an interval between the first blocks is larger than an interval between the second blocks.

5. The separator for a fuel cell of claim 1, wherein:
the plurality of guide patterns include inflow guide patterns provided in the first region and outflow guide patterns provided in the second region; and
the inflow guide patterns and the outflow guide patterns extend in different directions.

6. The separator for a fuel cell of claim 5, wherein the outflow guide patterns extend in a direction toward the outlet manifold.

7. The separator for a fuel cell of claim 5, wherein:
the plurality of guide patterns include a plurality of sets of blocks that extend in a same direction and are spaced apart from each other; and
any one set of the inflow guide patterns extends in parallel to a direction in which another set extends.

8. The separator for a fuel cell of claim 5, wherein:
the inflow guide patterns include a first inflow guide pattern and a second inflow guide pattern;
the outflow guide patterns include a first outflow guide pattern and a second outflow guide pattern; and
the first inflow guide pattern and the second inflow guide pattern extend in thea same direction, and the first outflow guide pattern and the second outflow guide pattern extend in different directions.

9. The separator for a fuel cell of claim 1, wherein:
the inlet manifolds are four in number and the outlet manifolds are two in number.

10. The separator for a fuel cell of claim 1, wherein:
the plurality of guide patterns include inflow guide patterns provided in the first region and outflow guide patterns provided in the second region;
the inflow guide patterns extend toward a boundary between the first region and the second region; and
the outflow guide patterns extend toward the outlet manifold.

11. The separator for a fuel cell of claim 10, wherein:
the outlet manifold is provided in plural number to be adjacent to the corners connected by the first symmetrical line; and
the inflow guide patterns are disposed in parallel to the second symmetrical line.

12. The separator for a fuel cell of claim 10, wherein the inflow guide patterns are disposed in parallel to a direction obtained via rotation at a specific angle based on a direction in which the second symmetrical line extends.

13. The separator for a fuel cell of claim 10, wherein:
the inflow guide patterns include a first inflow guide pattern and a second inflow guide pattern;
the first inflow guide pattern is disposed adjacent to the second symmetrical line compared with the second inflow guide pattern; and
an interval between blocks constituting the second inflow guide pattern is less than an interval between blocks constituting the first inflow guide pattern.

14. The separator for a fuel cell of claim 10, wherein:
the outflow guide patterns include a first outflow guide pattern and a second outflow guide pattern;
the first outflow guide pattern is disposed adjacent to the first symmetrical line compared with the second outflow guide pattern; and an interval between the blocks constituting the second outflow guide pattern is less than an interval between the blocks constituting the first outflow guide pattern.

15. A fuel cell stack comprising:

a unit cell including an air electrode, an electrolyte, and a fuel electrode; and a separator including a central part with a rectangular shape and a surrounding part disposed to surround the central part, wherein:

the unit cell and the separator are each provided in plural number and are alternately stacked;

the surrounding part includes an outlet manifold positioned at a pair of corners of the central part, which are opposed to each other, and an inlet manifold positioned along a side of the central part to be adjacent to another corner except for the pair of corners at which the outlet manifold is positioned; and the central part includes a plurality of guide patterns that are spaced apart from each other to guide fluids introduced through the inlet manifold toward the outlet manifold, wherein:

the central part includes four sub central parts defined by a first symmetrical line and a second symmetrical line, which connect corners;

each of the sub central parts is defined as a first region adjacent to the inlet manifold and a second region adjacent to the outlet manifold;

the plurality of guide patterns include inflow guide patterns provided in the first region and outflow guide patterns provided in the second region; and the inflow guide patterns extend toward a boundary between the first region and the second region, and the outflow guide patterns extend toward the outlet manifold.

16. The fuel cell stack of claim 15, wherein:

the inflow guide patterns include a first inflow guide pattern and a second inflow guide pattern, and the outflow guide patterns include a first outflow guide pattern and a second outflow guide pattern;

blocks constituting the first inflow guide pattern have a different size from blocks constituting the second inflow guide pattern; and blocks constituting the first outflow guide pattern have a different size from blocks constituting the second outflow guide pattern.

17. The fuel cell stack of claim 16, wherein the first symmetrical line is an imaginary line connecting the outlet manifolds disposed at the pair of corners; and an interval between the block constituting the first inflow guide pattern is larger than an interval between the blocks constituting the second inflow guide pattern.

18. The fuel cell stack of claim 16, wherein the first symmetrical line is an imaginary line connecting the outlet manifolds disposed at the pair of corners; and an interval between the block constituting the first outflow guide pattern is larger than an interval between the blocks constituting the second outflow guide pattern.

* * * * *